(12) United States Patent
Mishra

(10) Patent No.: US 7,088,900 B1
(45) Date of Patent: Aug. 8, 2006

(54) ALKALI AND FLUORINE DOPED OPTICAL FIBER

(75) Inventor: Snigdharaj Kumar Mishra, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/106,860

(22) Filed: Apr. 14, 2005

(51) Int. Cl.
*G02B 6/00* (2006.01)

(52) U.S. Cl. .................... 385/142; 385/123; 385/124; 385/126; 385/127; 385/141; 385/144

(58) Field of Classification Search ............... 385/142
See application file for complete search history.

(56) References Cited

U.S. PATENT DOCUMENTS

| | | | | |
|---|---|---|---|---|
| 3,778,132 | A | 12/1973 | Pinnow et al. .............. | 385/123 |
| 4,372,647 | A | 2/1983 | Okamoto et al. ........... | 385/127 |
| 4,388,093 | A | 6/1983 | Kimura et al. ................ | 65/432 |
| 4,421,540 | A | 12/1983 | Nakahara et al. ............. | 65/379 |
| 4,770,494 | A | 9/1988 | Csencsits et al. ........... | 385/142 |
| 4,797,143 | A | 1/1989 | Chida et al. ................... | 65/382 |
| 5,055,121 | A | 10/1991 | Kanamori et al. ............ | 65/398 |
| 5,146,534 | A * | 9/1992 | Lines .......................... | 385/142 |
| 5,242,476 | A | 9/1993 | Bartel et al. .................. | 65/399 |
| 6,131,413 | A | 10/2000 | Rousseau et al. ............. | 65/377 |
| 6,385,379 | B1 | 5/2002 | Rousseau et al. .......... | 385/123 |
| 2002/0144523 | A1 | 10/2002 | Orita et al. .................... | 65/537 |
| 2002/0170320 | A1 | 11/2002 | Schotz et al. ................. | 65/413 |
| 2004/0042759 | A1 * | 3/2004 | Park et al. ................... | 385/142 |
| 2004/0123630 | A1 | 7/2004 | Sarkar ........................... | 65/421 |
| 2004/0159124 | A1 | 8/2004 | Atkins et al. .................. | 65/391 |
| 2004/0187525 | A1 | 9/2004 | Coffey et al. ................. | 65/390 |
| 2004/0200240 | A1 | 10/2004 | Abe et al. ...................... | 65/397 |
| 2005/0063663 | A1 * | 3/2005 | Anderson et al. ........... | 385/142 |
| 2005/0089289 | A1 | 4/2005 | Hayami et al. ............. | 385/127 |

FOREIGN PATENT DOCUMENTS

| EP | 0 181 595 | 5/1986 |
|---|---|---|
| EP | 1 281 988 | 2/2003 |

OTHER PUBLICATIONS

Nagayama et al., "Ultra Low Loss (0.1484 dB/km) Pure Silica Core Fiber", SEI Technical Review, No. 57, Jan. 2004, p. 3-6.

Yamamoto et al., "Water-Free Pure-Silica-Core Fibre", ECOC (European Conference on Optical Communication), Sep. 5-9, 2004, Stockholm, Sweden, session Th2.3.1, Sep. 2004. p. 1-4.

\* cited by examiner

*Primary Examiner*—Frank G. Font
*Assistant Examiner*—Derek L. Dupuis
(74) *Attorney, Agent, or Firm*—Randall S. Wayland

(57) ABSTRACT

Disclosed is an optical fiber having a core of $SiO_2$ doped with fluorine and an alkali metal oxide dopant. The alkali metal oxide is selected from the group consisting of K, Na, Li, Cs and Rb and is provided in amount of at least 20 ppm wt. %. The fiber has an inner cladding surrounding the core, which also includes fluorine. A relative refractive index of the inner cladding ($\Delta_2$%), measured relative to pure silica, is preferably between −0.39% and −0.7%. The fiber preferably exhibits attenuation at 1550 nm of less than or equal to 0.178 dB/km.

20 Claims, 12 Drawing Sheets

ALKALI AND FLUORINE DOPED OPTICAL FIBER

BACKGROUND OF THE INVENTION

1. Field of the Invention

The present invention relates generally to an optical fiber, and more particularly to a low-loss, silica-containing optical fiber doped with an alkali metal oxide.

2. Technical Background

Attenuation is a principal limiting attribute of optical fibers. Optical fiber loss, for example, plays an important role in limiting the distance between optical fiber amplifiers. This is particularly important in long distance and ultra-long distance networks such as, for example, undersea applications, where such amplifiers represent a significant system cost, as well as a major factor in system reliability. Consequently there is tremendous commercial interest in reducing attenuation to the lowest possible level.

SUMMARY OF THE INVENTION

According to one broad aspect, the present invention is an optical fiber, comprising a core including $SiO_2$, fluorine, and an alkali metal oxide selected from the group consisting of K, Na, Li, Cs and Rb. The alkali metal oxide is preferably provided in the core in an amount of at least 20 ppm wt. %, and the core includes a relative refractive index ($\Delta_1\%$) measured at 2 microns offset from a fiber centerline. $K_2O$ is the most preferred alkali metal oxide. A cladding including an inner cladding surrounds the core, and also preferably includes fluorine. Preferably, the inner cladding has an inner cladding relative refractive index ($\Delta_2\%$), measured relative to pure silica, of between $-0.39\%$ and $-0.7\%$. This fiber composition and structure desirably may achieve very low attenuation.

According to further aspects of the invention, the core relative refractive index ($\Delta_1\%$) is preferably zero or less; and is more preferably between 0.0% and $-0.12\%$. In some embodiments, the core relative refractive index ($\Delta_1\%$) is zero or less; more preferably between 0.0 and $-0.15\%$. In other embodiments, the core relative refractive index ($\Delta_1\%$) negative; preferably between $-0.02\%$ and $-0.12\%$. Preferably, the optical fiber is single-moded at 1550 nm. In another preferred aspect, $\Delta_2\%-\Delta_1\%$ is between $-0.7\%$ and $-0.38\%$; more preferably between $-0.42\%$ and $-0.38\%$. The core preferably includes an alpha profile on its outer edge having an $\alpha$ value of between 12 and 20; more preferably between 14 and 16.

In some embodiments, the fiber includes a raised center portion having a center relative refractive index ($\Delta_0\%$) which is greater (higher relative top pure silica) than ($\Delta_1\%$); more preferably between $-0.15\%$ and 0.20%. The outer radius ($R_0$) of the center portion is preferably located at between 0.2 µm and 1.5 µm from the fiber's centerline, CL. The outer radius ($R_1$) of the core is preferably between 3.9 to 6.0 µm from the centerline; more preferably between 3.9 to 5.0 µm.

Preferably, the core includes fluorine doping in a peak amount greater than 1000 ppm wt. % (0.1 wt. %), more preferably greater than 2000 ppm wt. % (0.2 wt %), and most preferably between 0.1 and 0.4 wt. %. Chlorine may be present in an amount of less than 500 ppm wt. %; more preferably less than 200 ppm wt. %. The alkali metal oxide doping is preferably in a peak amount of between 20 and 1000 ppm wt. %; more preferably between 50–500 ppm wt. %; most preferably 50–300 ppm wt. %; and in some embodiments between 50–200 ppm wt. %. Most preferably, the core includes substantially no $GeO_2$.

Optical fibers in accordance with the invention may exhibit very low attenuation. Fiber attenuation at 1550 nm is preferably less than 0.178 dB/km, or even less than 0.175 dB/km, and in some embodiments 0.173 dB/km or less. The fiber preferably also exhibits total dispersion of between 15 and 25 ps/nm/km at 1550 nm, and may also preferably exhibit a dispersion slope at 1550 nm of less than 0.07 ps/nm/km$^2$. Lambda zero is preferably placed between 1275 and 1325 nm. Effective area for the fiber is preferably greater than 60 µm$^2$ at 1550 nm; more preferably between 60–100 µm$^2$. The fiber also preferably exhibits good bend properties with macro-bend loss of less than 25 dB/m for 20 turns on a 20 mm diameter mandrel; more preferably less than 1 dB/m for 20 turns on a 20 mm diameter mandrel.

Additional features and advantages of the invention will be set forth in the detailed description which follows, and in part will be readily apparent to those of ordinary skill in the art from that description or recognized by practicing the invention as described herein, including the detailed description which follows, the claims, as well as the appended drawings. It is to be understood that both the foregoing general description and the following detailed description present embodiments of the invention, and are intended to provide an overview or framework for understanding the nature and character of the invention as it is claimed. Where appropriate, identical features have been identically numbered.

DETAILED DESCRIPTION OF THE INVENTION

Figure 1:
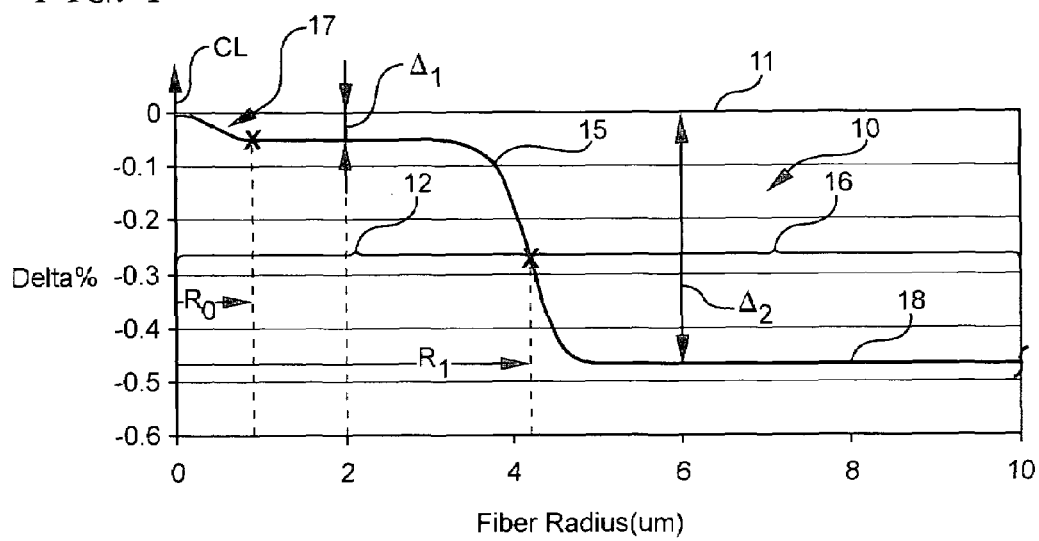
FIG. 1 is a relative refractive index plot of a first embodiment of optical fiber in accordance with the present invention.
Figure 2:
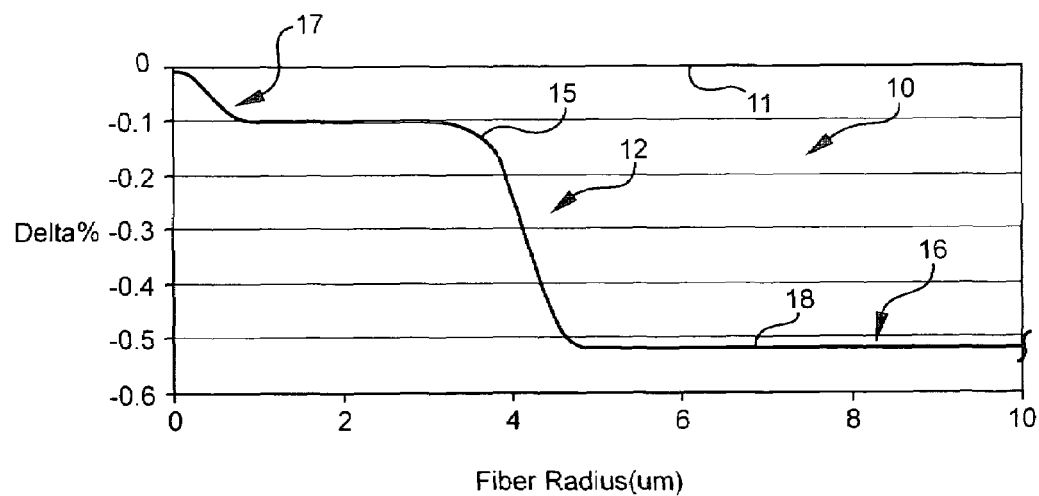
FIGS. 2–20 are relative refractive index plots of alternate embodiments of the optical fiber in accordance with the present invention.
Figure 3:
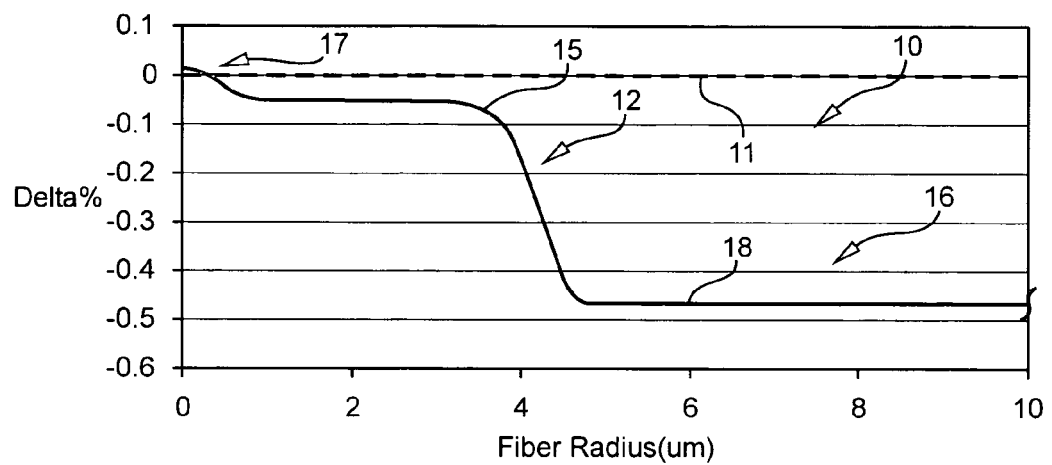

The present invention is a low attenuation optical fiber. More specifically, the present invention is an optical fiber having a central core, and cladding surrounding the core wherein the core is doped with both an alkali metal oxide and fluorine. The cladding is preferably also doped with fluorine, and may include the alkali metal oxide as well. The cladding includes an inner cladding, but may also include an outer cladding, both of which are preferably doped with fluorine. The doping of the inner cladding surrounding and abutting the core is preferably in amount sufficient to provide an inner cladding relative refractive index below that of silica, more preferably between $-0.39\%$ and $-0.7\%$, measured relative to a reference index level of pure silica.

The following terms as used herein have the following defined meanings:

MFD—The mode field diameter is a measure of optical power across the end face of a single-mode optical fiber, and is expressed as:

$$2\omega_0 = (\lambda/\pi)[2\int I(\Phi)\sin\Phi\cos\Phi d\Phi / \int I(\Phi)\sin^3\Phi\cos\Phi d\Phi]^{1/2} \quad (1)$$

where $2\omega_0$ is the mode field diameter (and therefore $\omega_0$ is the mode field radius), $\lambda$ is the mean wavelength of the light, $\Phi$ is the angle with respect to the center of the radiation pattern, and the integrations are preferably carried out from 0° to 90°. Mode field diameter may be measured, for example, according to test procedure ANSI/TIA/EIA-455-191-A-2001.

Aeff—Effective area is:

$$A_{\mathit{eff}} = 2\pi (\int E^2 r\, dr)^2 / (\int E^4 r\, dr) \quad (2)$$

where the integration limits are 0 to ∞, and E is the electric field associated with the propagated light at 1550 nm.

Delta or Δ—The relative refractive index, Δ, is defined by the equation $\Delta_i = (n_i^2 - n_c^2)/2n_i^2$, where $n_i$ is the maximum refractive index of the index profile segment i, and $n_c$ is the refractive index in the reference region which is usually taken to be the minimum index of the cladding layer. The relative refractive index is generally expressed as a percent and is indicated herein by the term Δ%. Unless otherwise indicated, Δ% represents the maximum (peak) relative refractive index of the segment being referred to relative to the index of silica.

Refractive Index Profile—The term refractive index profile or simply index profile is the relation between Δ% and radius over the optical fiber.

Alpha Profile—The term alpha profile refers to a core refractive index profile which follows the equation, $$n(r) = n_0 (1 - [r/a]^\alpha) \quad (3)$$

where r is core radius, a is the last point in the profile, r is chosen to be zero at the first point of the profile, $n_0$ is the maximum refractive index of the core region of interest, and α is an exponent which defines the core profile shape.

Core—Core refers to that portion of the optical fiber which has a generally raised index of refraction relative to the cladding, so that the transmitted optical power propagates predominately through the core. The core may be comprised of one or more segments. An individual core segment may have a refractive index greater than pure silica, equal to pure silica, or less than pure silica.

Cladding—Cladding, or cladding segment, refers to that portion of the optical fiber surrounding the core region, and is defined to occur where the absolute magnitude of the relative refractive index is the lowest and remains low (+/−0.05%) up to the outermost radius of the silica-based part of the optical fiber, that is, up to the outermost radius of the cladding. The core ends, and the cladding begins, at a radius $R_1$, and the cladding ends at a radius $R_3$, where $R_3 \gg R_1$.

ppm—Unless otherwise specifically noted otherwise, refers to parts per million by weight, or "ppm by weight", or "ppm by wt.", and a measurement in weight percent (wt %) can be converted to ppm by multiplying by a factor of 10,000.

Pin array test—This test is used to test compare relative resistance of optical fibers to macro-bending. To perform this test, attenuation loss is measured at 1550 nm when the optical fiber is arranged such that no induced bending loss occurs. This optical fiber is then woven about the pin array and attenuation again measured at the same wavelength. The loss induced by bending is the difference between the two attenuation measurements (in dB). The pin array is a set of ten cylindrical pins arranged in a single row and held in a fixed vertical position on a flat surface. The pin spacing is 5 mm, center-to-center. The pin diameter is 0.67 mm. The optical fiber is caused to pass on opposite sides of adjacent pins. During testing, the optical fiber is placed under enough tension sufficient to make to the optical fiber conform to a portion of the periphery of the pins.

Lateral load test—The lateral load test provides a measure of the micro-bending resistance of the optical fiber. In this test, a prescribed length of optical fiber is placed between two flat plates. A No. 70 wire mesh is attached to one of the plates. The known length of optical fiber is sandwiched between the plates and the reference attenuation is measured while the plates are pressed together with a force of 30 newtons. A 70 newton force is then applied to the plates and the increase in attenuation and dB/m is measured. This increase in attenuation is the lateral load attenuation (dB/m) of the optical fiber.

According to the invention, most preferably, only the core of the present invention optical fiber 10 contains an alkali metal oxide dopant and fluorine. As described herein, the alkali metal oxide is preferably an oxide of K, Na, Li, Cs, or Rb, or a mixture thereof. Most preferably, the core includes an alkali metal oxide such as $K_2O$ or $Rb_2O$. In accordance with a preferred method of manufacturing the fiber, it is preferable to have the peak alkali metal oxide concentration in the preferred single mode optical fiber be substantially coincident with the centerline, CL, of the optical fiber. Thus, preferably, the alkali metal oxide has a peak concentration resident in the optical fiber's core. As will be recognized, the alkali metal oxide concentration preferably varies radially across the radius of the optical fiber as is shown in FIG. 23.

Figure 23:
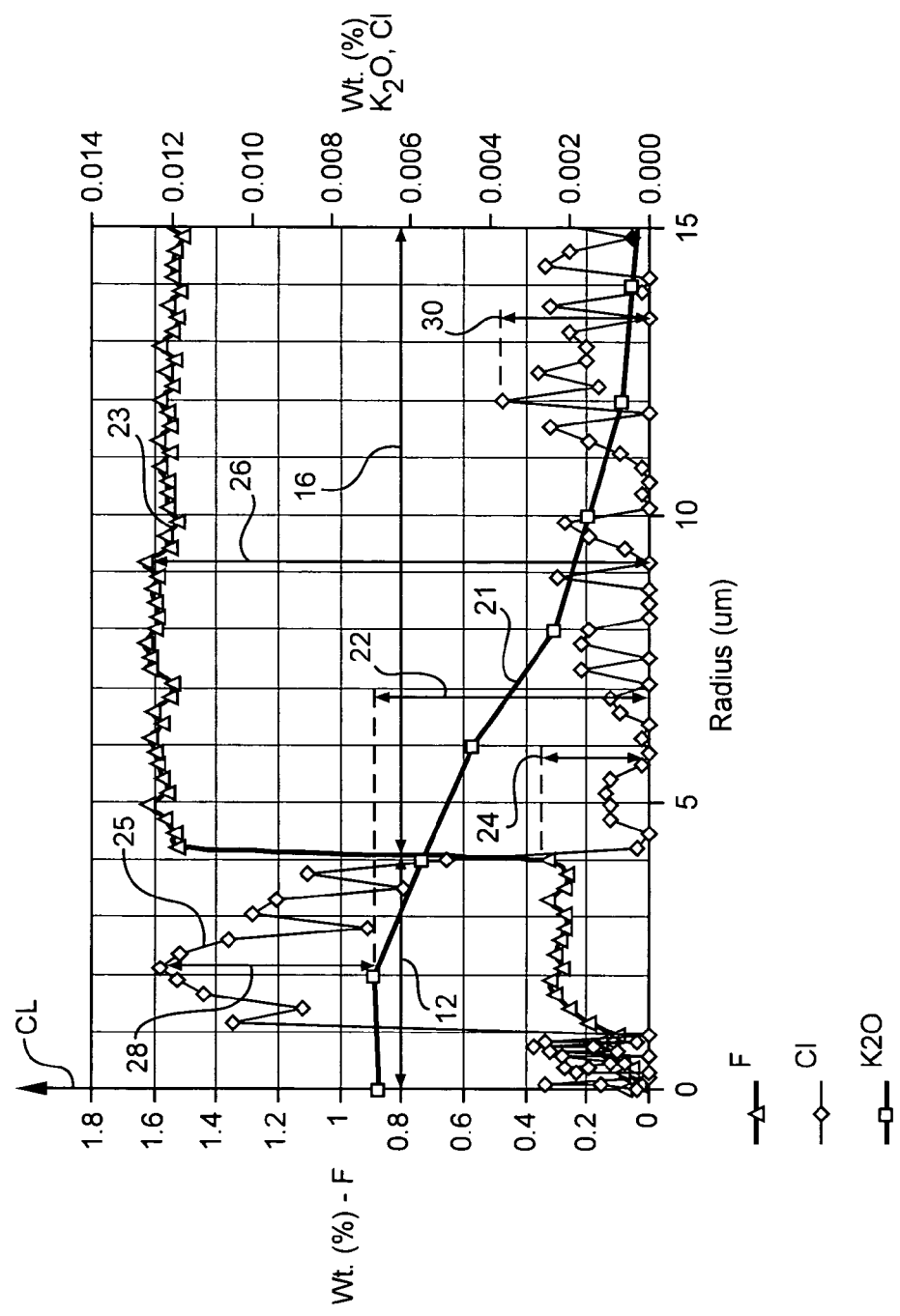
FIG. 23 is a plot of dopant concentration as a function of radius for a representative embodiment of the optical fiber in accordance with the present invention.

Generally, as best shown in FIG. 23, the peak concentration of the alkali metal oxide exists at the centerline, CL, of the fiber and the concentration of alkali metal oxide decreases as a function of increasing radius from the centerline of the optical fiber along at least a portion of the optical fiber radius (see plot labeled 23 illustrating the wt. % of $K_2O$ as a function of fiber radius). Typically, less than 50% of the peak amount of alkali metal oxide (such as $K_2O$) will exist beyond a radius of 10 μm from the fiber's centerline, CL.

Preferably, the peak concentration 22 of alkali metal oxide in the core of the optical fiber is in an amount between 20–1000 ppm wt. %.; more preferably between 50–500 ppm wt. %; most preferably 50–300 ppm wt. %; and in some embodiments between 50–200 ppm wt. %. The wt. % of $K_2O$ is shown on the right-most vertical axis of FIG. 23. The peak amount of alkali metal oxide in the cladding of the optical fiber is preferably less than the peak amount of alkali metal oxide in the core. Preferably, the peak amount of alkali metal oxide in the cladding is less than about 100 ppm wt. %; more preferably less than about 60 ppm wt. %.

Again referring to FIGS. 1 and 23, the core 12 also preferably includes fluorine doping. The plot of fluorine doping is labeled 23 in FIG. 23 and corresponds to the values of wt. % on the left-most vertical axis. Most preferably, the core 12 includes fluorine doping at a first level 24 and the cladding 16 includes fluorine doping at at least one second level 26, different from, and preferably higher than, the first level. Preferably, the first level 24 includes fluorine doping in an amount greater than 1000 ppm wt. % (0.1 wt. % F); more preferably greater than 2000 ppm wt. % (0.2 wt. % F); and more preferably yet greater than 3000 ppm wt. % (0.3 wt. % F). Most preferably, the first level 24 is between about 1000 ppm wt. % (0.1 wt. % F) and 5000 (0.5 wt. % F). Likewise, the cladding 16 preferably also includes fluorine doping. The peak amount 26 of fluorine in the cladding 16 is greater than in the core; preferably in the amount 26 between 10,000 (1.0 wt. %) and 30,000 ppm wt. % (3.0 wt. %), more preferably between about 10,000 (1.0 wt. %) and 20,000 ppm wt. % (2.0 wt. %), and more preferably yet between about 12,500 (1.25 wt. %) and 17,500 ppm wt. % (1.75 wt. %). In particular, the amount 26 of fluorine doping in the cladding 16 is sufficient to provide, in the drawn fiber, the relative refractive indices as described in more detail below.

In addition to the alkali oxide and fluorine doping, the fiber 10 preferably also includes chlorine doping in various portions thereof. In particular, chlorine is preferably present in the core 12 and may also be present in the cladding 16, preferably in lesser peak amounts in the cladding as shown, for example, in FIG. 23. The core 12 preferably includes chlorine doping in a peak amount 28 of less than 500 ppm wt. % (0.05 wt. %); more preferably less than 200 ppm wt. % (0.02 wt. %). In particular, the location of the peak amount of chlorine doping in the core 12 is preferably offset from the centerline, CL, of the fiber, preferably by 0.5 μm or greater, and most preferably greater than 1.0 μm. It should be recognized that only small amounts of chlorine (e.g., less than 500 ppm Cl) are present at the same locations where large amounts of the alkali-metal oxide are present. The peak amount 30 of chlorine in the cladding 16 is preferably 200 ppm wt. % or less; more preferably less than 100 ppm wt. %.

Figure 4:
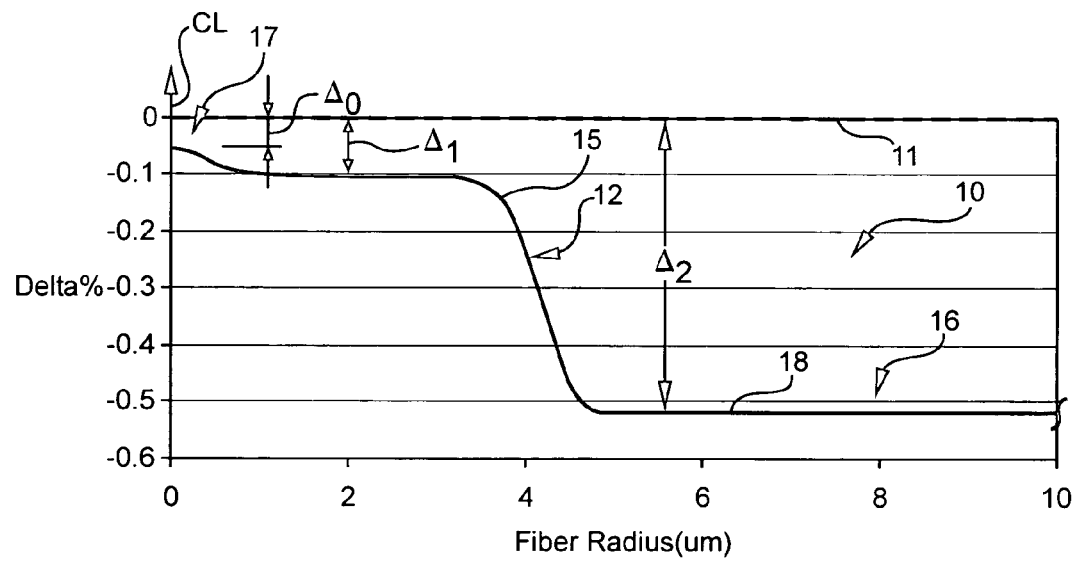
Figure 5:
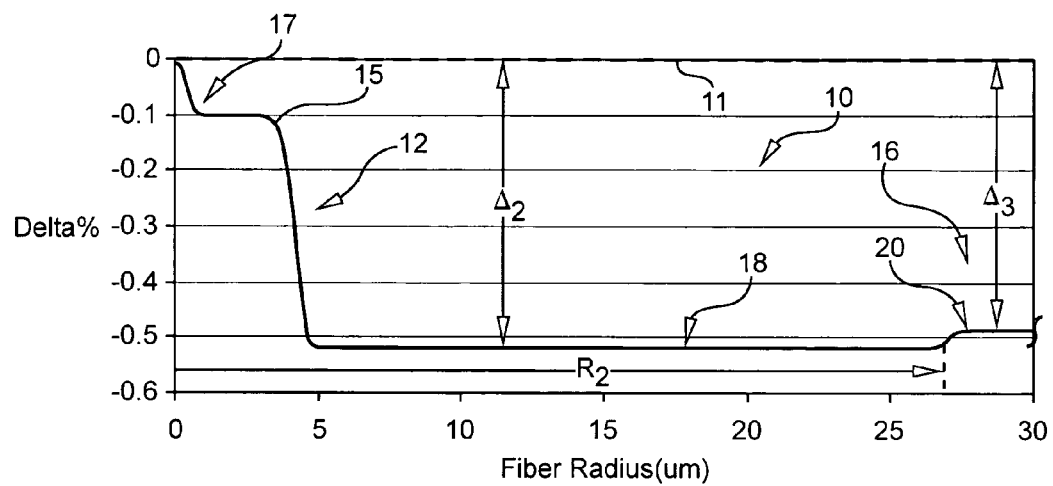
Figure 6:
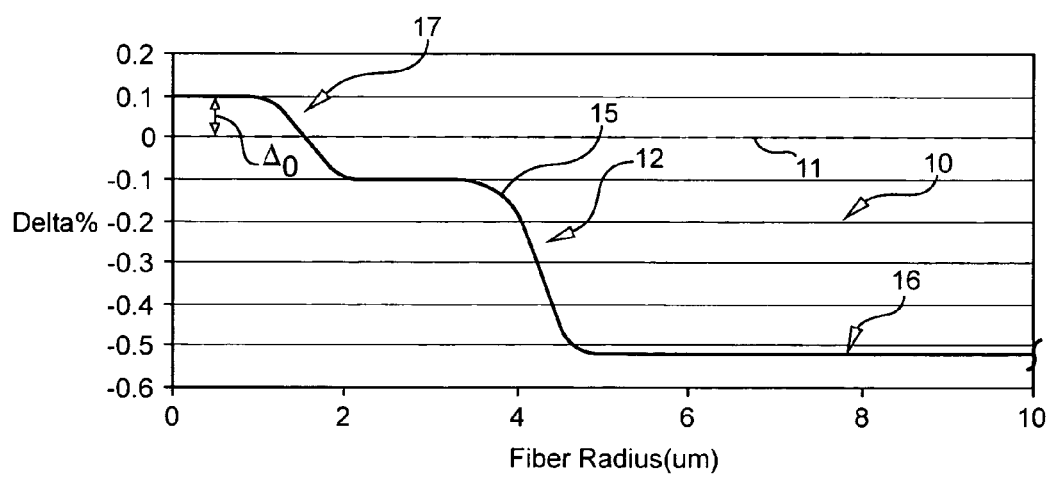
Figure 7:
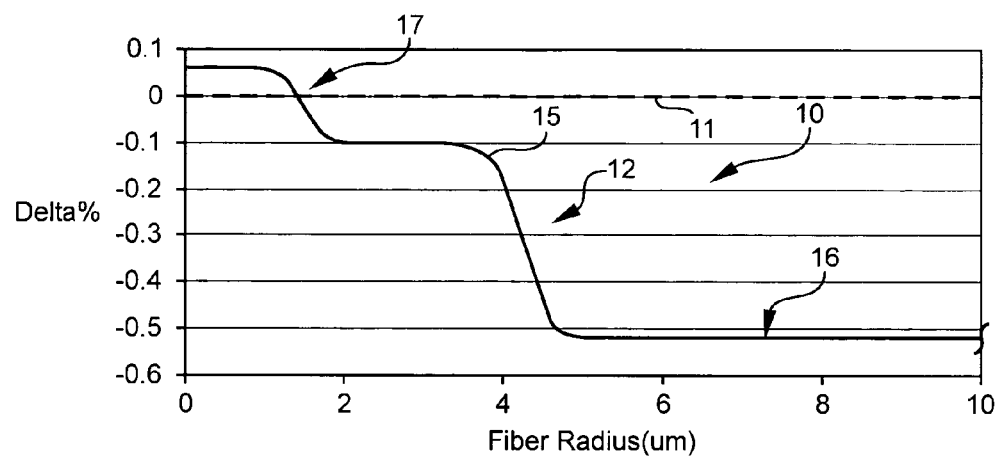
Figure 8:
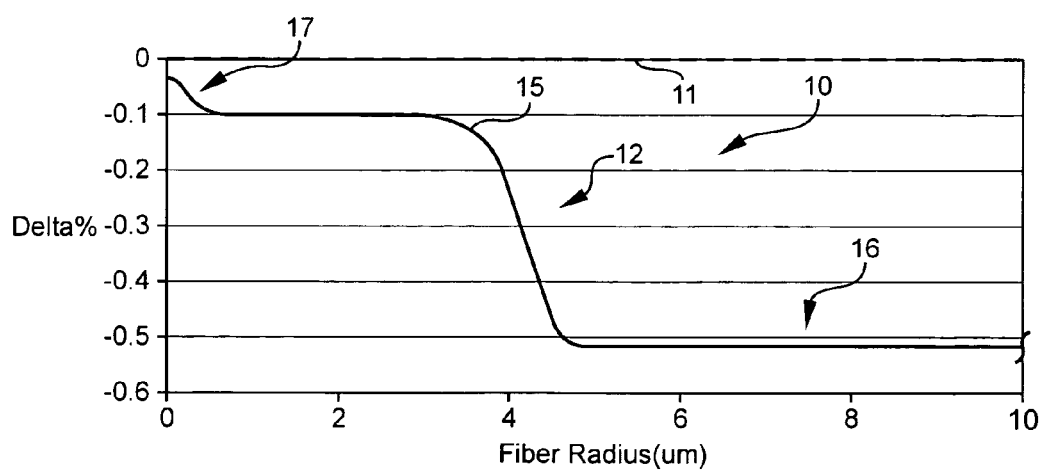
Figure 9:
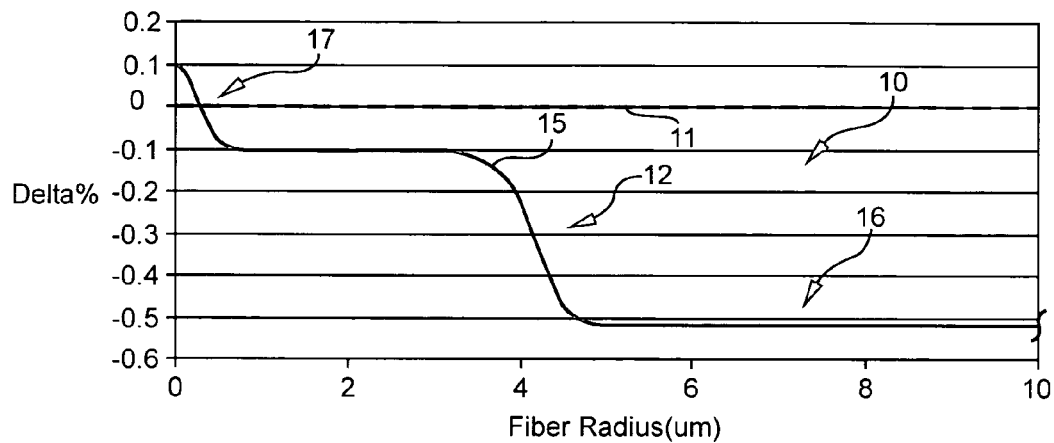
Figure 10:
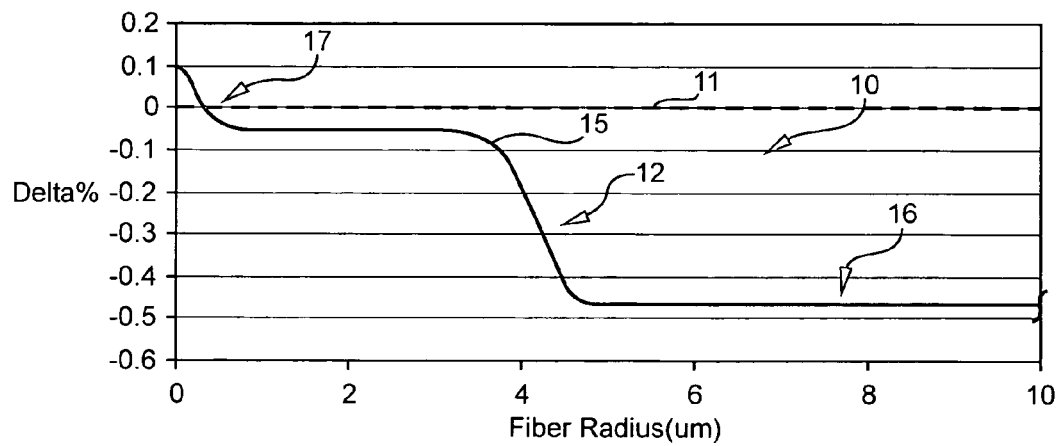
Figure 11:
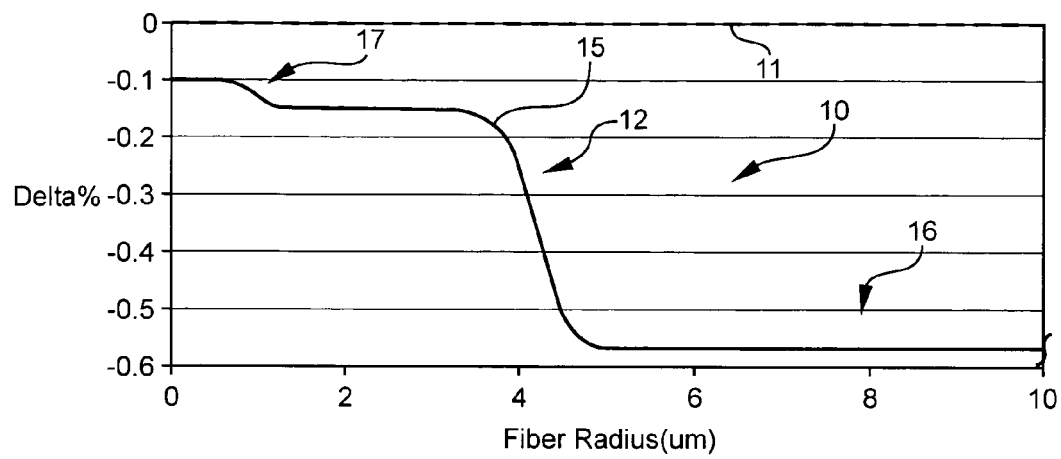
Figure 12:
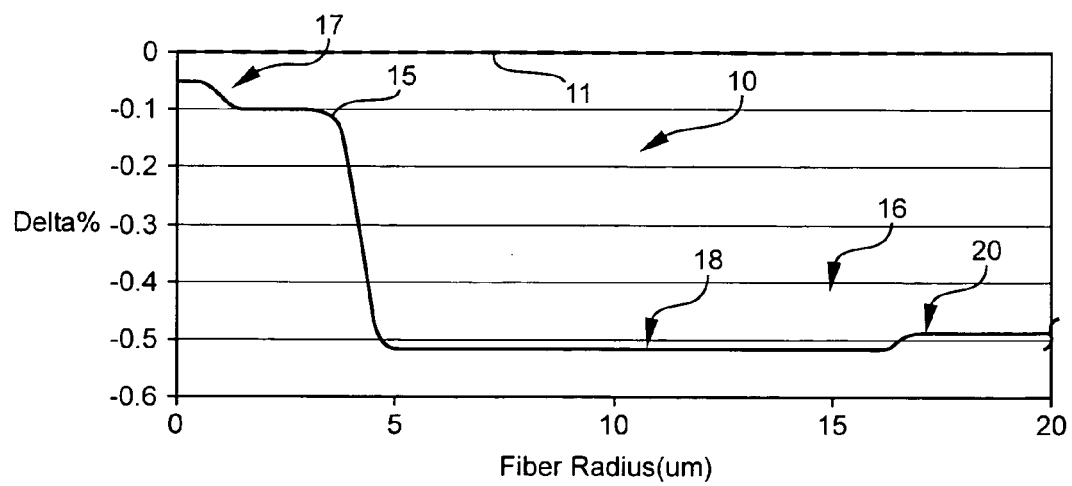
Figure 13:
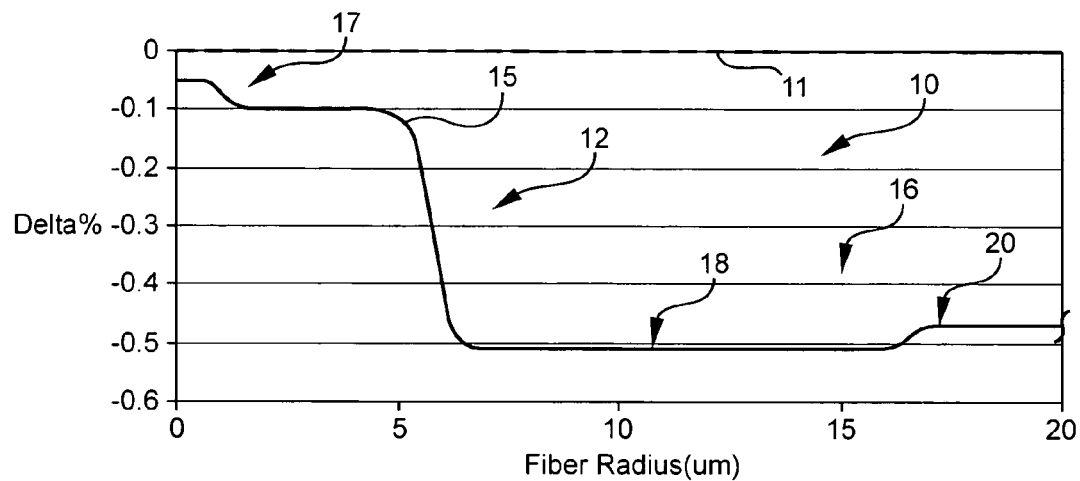
Figure 14:
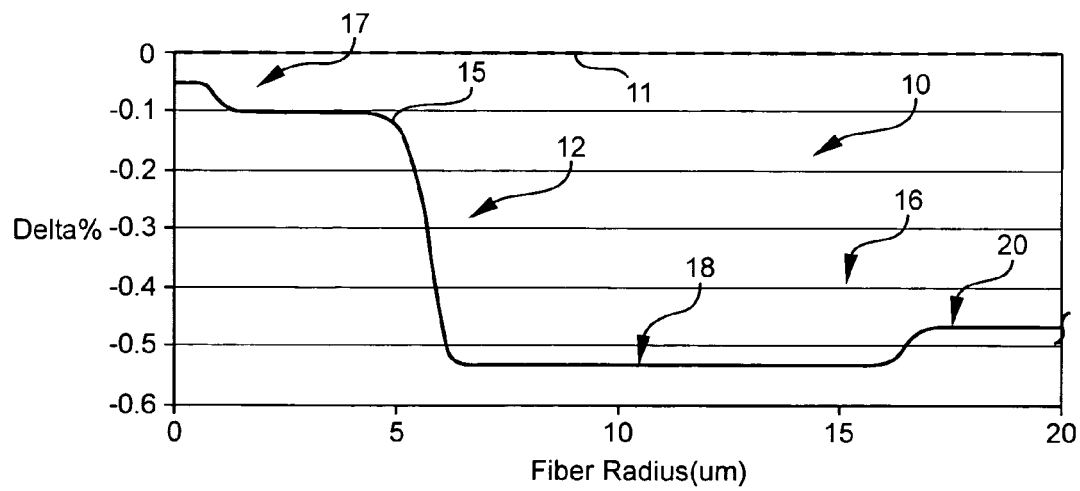
Figure 15:
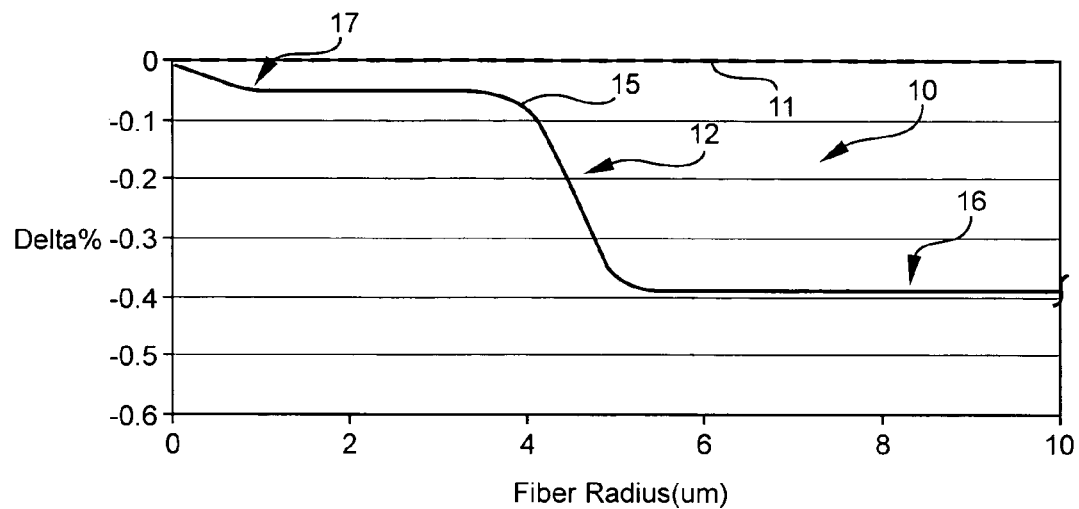
Figure 16:
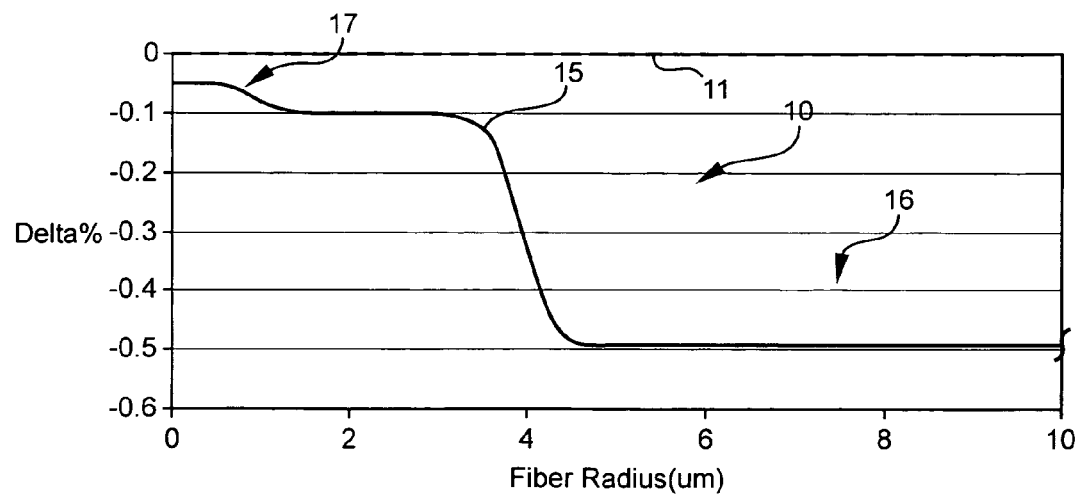
Figure 17:
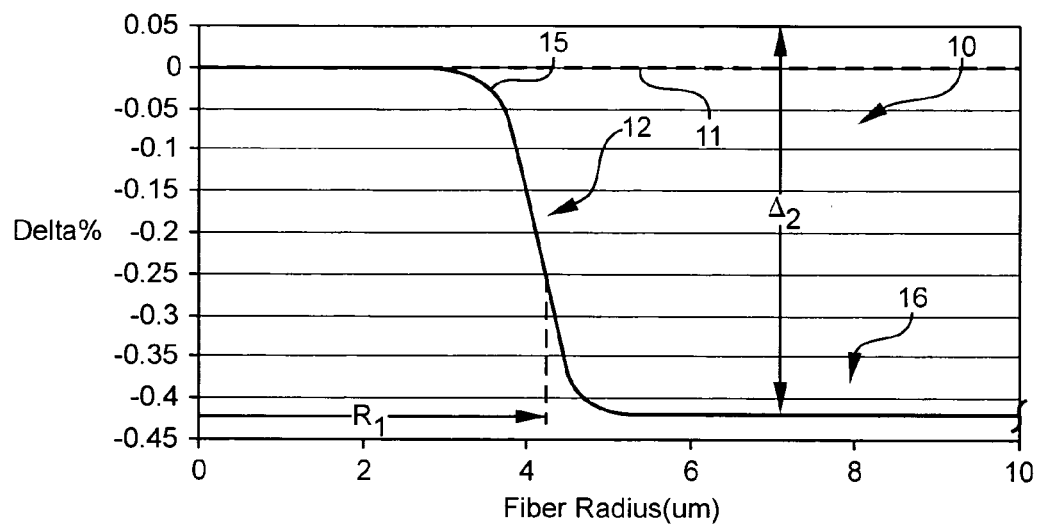
Figure 18:
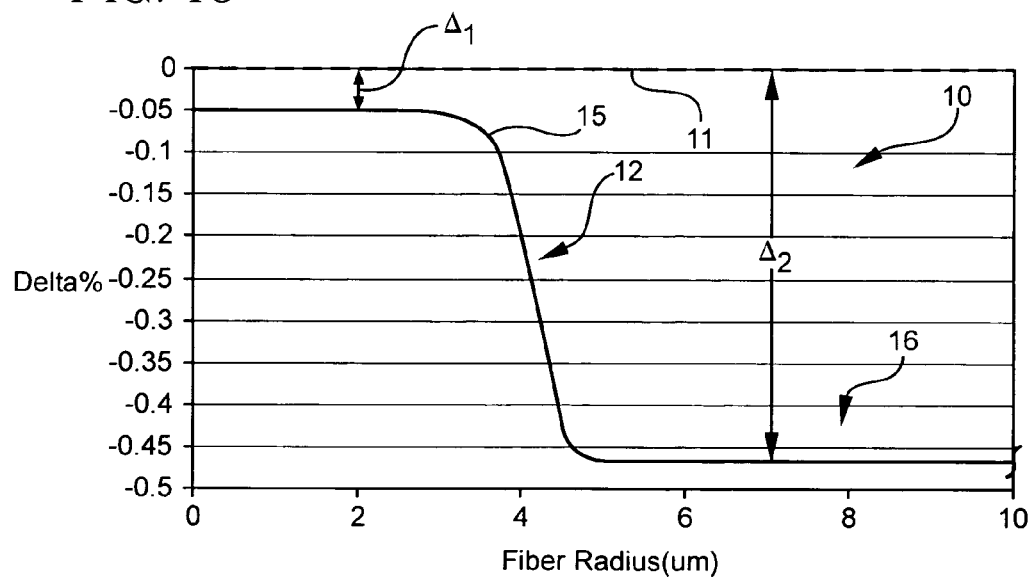
Figure 19:
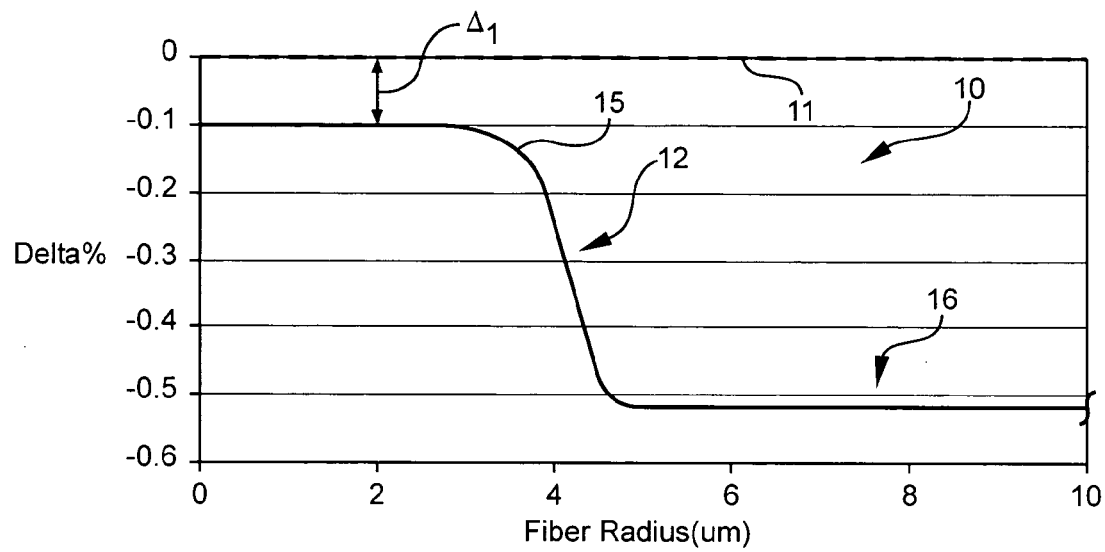

FIGS. 1 and 4 show exemplary refractive index profiles of embodiments of optical fiber 10 including the alkali metal oxide and fluorine doping according to the invention. These plots show the conventions used throughout the specification to define the structure for the fiber, and, thus, they will not be repeated for the embodiments shown in FIGS. 2–3 and 5–22 shown herein. However, it should be recognized that these conventions apply equally to those profiles, which have not labeled for clarity.

The fiber 10 is preferably single moded at 1550 nm and includes a core segment 12 including alkali metal oxide and fluorine doping, and also preferably chlorine doping, and the profiles as shown and described herein. The core segment 12 is preferably centered about, surrounds, and contacts the centerline, CL, of the fiber 10. The optical fiber 10 further includes a cladding segment 16 surrounding, and in contact with, the core segment 12. Preferably, both the core segment 12 and the cladding segment 16 include fluorine so as to provide relative refractive indexes (as compared to pure silica) which are negative for at least the cladding, and preferably the core and cladding as will be described herein. The cladding 16 includes at least a single-level cladding structure with an inner cladding 18, but may optionally include a dual-level cladding structure including both an inner 18 and an outer 20 cladding, as will be described in detail herein (see FIGS. 5, 12–14 illustrating a dual-level cladding structure). The cladding 16 encircles and extends radially from an outermost portion of the core 12 to the outermost periphery of the glass portion of the fiber 10 at an outer radius of about 62.5 microns. In the single cladding structure herein the cladding includes only the inner cladding 18, the inner cladding extends from the core 12 to the outermost glass portion of the fiber 10. As shown herein, for clarity, only a portion of the cladding 16 is shown. It should be recognized that, in all figures, the portion not shown continues to extend to the outside of the glass fiber at about 62.5 microns at the same level of relative refractive index as shown on the right-most portion of the figures.

According to another preferable feature, the outermost edge of the core segment 12 of the present invention optical fiber 10 preferably has a rounded step shape as shown in FIGS. 1–22 with a core refractive index, $\Delta_1\%$, and a desired alpha profile with a predetermined core alpha defining the rounded corner shape. The core segment 12 of the optical fiber 10 preferably includes an alpha profile on its outer edge 15 having an α value of between 12 and 20; more preferably between 14 and 16.

The core's relative refractive index, $\Delta_1\%$, which is measured and defined herein at 2 μm from the fiber's centerline, CL, is preferably zero or less; with the core relative refractive index, $\Delta_1\%$, most preferably being between 0.0% and −0.15%. In some embodiments, the core relative refractive index, $\Delta_1\%$, is negative; preferably between −0.02% and −0.15%, measured relative to the level of pure silica 11. This level of down-doping in the core is achieved by adding a sufficient amount of fluorine to the core segment 12 when forming the optical fiber perform from which the fiber is drawn. Fluorine is also added to the cladding 16 to provide a cladding relative refractive index, $\Delta_2\%$, which is negative, and which is most preferably between −0.39% and −0.70% measured relative to the level of pure silica 11; more preferably between −0.40 and −0.70%; and more preferably yet between −0.40 and −0.60%. It should be recognized that the core preferably includes substantially no $GeO_2$.

For the family of optical fibers according to the invention, $\Delta_2\%$ and $\Delta_1\%$ are preferably selected such that $\Delta_2\%-\Delta_1\%$ is in the range between −0.7 and −0.38%; more preferably between −0.42 and −0.38%.

Certain ones of the fibers (Ex. 1–16, 20–22) include a raised center portion 17, preferably located at the fiber's centerline, CL. The center portion 17 has a peak relative refractive index, $\Delta_0\%$, wherein $\Delta_0\%$ is positive, zero, or less negative than $\Delta_1\%$, measured relative to the level of pure silica 11. In all cases, $\Delta_0\%$ has an index level preferably greater than $\Delta_1\%$ (above the index level of $\Delta_1\%$). Most preferably, the center portion 17 has a delta ($\Delta_0\%$) in the range between −0.15% and 0.20%, measured relative to the pure silica level 11.

In more detail, the family of optical fibers 10 according to the invention preferably have a relative refractive index profile structure as follows. Preferably, the core 12 has an outer radius, $R_1$, of between 3.9 to 6.0 μm from the fiber's centerline, CL; more preferably between 3.9 to 5.0 μm. The radius, $R_1$, is defined and measured herein at half of ($\Delta_2\%-\Delta_1\%$). In other words, $R_1$ is measured at half the height of the core 12 (excluding the raised portion 17). For the embodiments of the fiber 10 described herein which include a raised center portion 17, it is preferably located at and surrounding the centerline, CL. The center portion 17 includes an outer radius, $R_0$, of between 0.2 μm and 1.5 μm and is raised above the core body largely due to the slight index rise brought on by the presence of the alkali dopant in the core.

In certain embodiments (as illustrated in FIGS. 5, and 12–14, for example) the cladding 16 includes an outer cladding 20 surrounding an inner cladding 18. Preferably, the inner cladding 18 has a relative refractive index $\Delta_3\%$ (FIG. 5) equal to $\Delta_2\%+/-0.05\%$ as measured relative to the level of pure silica 11. For those of the fibers 10 according to the invention which have a dual cladding structure, the interface between the outer cladding 20 and the inner cladding 18 is located at an interface radius ($R_2$) of between 13 to 29 μm from the centerline; more preferably between 15 to 20 μm. The ratio of $R_2/R_1$ is preferably between 2.5 to 6.0.

The following Tables 1 and 2 illustrate several modeled example embodiments of the fiber according to the invention. In particular, Table 1 below illustrates the refractive index structure of the fiber, including values for $\Delta_0\%$, $\Delta_1\%$, $\Delta_2\%$, $\Delta_3\%$, $R_0$, $R_1$, $R_2$, and $\alpha$.

TABLE 1 refractive index profile structure for modeled examples

| Ex. # | $\Delta_0$ (%) | $\Delta_1$ (%) | $\Delta_2$ (%) | $\Delta_3$ (%) | $R_0$ (µm) | $R_1$ (µm) | $R_2$ (µm) | $\alpha$ |
|---|---|---|---|---|---|---|---|---|
| 1 | 0.00 | −0.05 | −0.468 | na | 1.0 | 4.175 | na | 14 |
| 2 | 0.00 | −0.10 | −0.518 | na | 1.0 | 4.175 | na | 14 |
| 3 | 0.015 | −0.05 | −0.468 | na | 1.0 | 4.175 | na | 14 |
| 4 | −0.05 | −0.10 | −0.518 | na | 0.8 | 4.175 | na | 14 |
| 5 | 0.00 | −0.10 | −0.518 | −0.488 | 1.0 | 4.175 | 26 | 14 |
| 6 | 0.10 | −0.10 | −0.518 | na | 1.8 | 4.328 | na | 14 |
| 7 | 0.06 | −0.10 | −0.518 | na | 1.8 | 4.328 | na | 14 |
| 8 | −0.03 | −0.10 | −0.518 | na | 0.5 | 4.175 | na | 14 |
| 9 | 0.10 | −0.10 | −0.518 | na | 0.6 | 4.175 | na | 14 |
| 10 | 0.10 | −0.05 | −0.468 | na | 0.7 | 4.175 | na | 14 |
| 11 | −0.10 | −0.15 | −0.568 | na | 1.3 | 4.213 | na | 14 |
| 12 | −0.05 | −0.10 | −0.518 | −0.488 | 1.3 | 4.213 | 16 | 14 |
| 13 | −0.05 | −0.10 | −0.508 | −0.468 | 1.5 | 5.713 | 15 | 14 |
| 14 | −0.05 | −0.10 | −0.528 | −0.468 | 1.5 | 5.713 | 15 | 14 |
| 15 | −0.01 | −0.05 | −0.386 | na | 1.0 | 4.513 | na | 14 |
| 16 | −0.05 | −0.10 | −0.491 | na | 1.0 | 3.910 | na | 14 |
| 17 | na | 0.00 | −0.418 | na | na | 4.160 | na | 14 |
| 18 | na | −0.05 | −0.468 | na | na | 4.160 | na | 14 |
| 19 | na | −0.10 | −0.518 | na | na | 4.150 | na | 14 |
| 20 | 0.00 | −0.06 | −0.450 | na | 1.45 | 4.425 | na | 14 |

TABLE 2

Optical properties for modeled examples (@ 1550 nm)

| Ex. # | Disp. ps/nm/km | Disp. Slope ps/nm²/km | Kappa nm | Cabled Cutoff nm | Pin Array dB/m | Aeff µm² | MFD µm | $\lambda_0$ nm | Attn. dB/km |
|---|---|---|---|---|---|---|---|---|---|
| 1 | 18.0 | 0.056 | 321 | 1413 | 0.85 | 71 | 9.6 | 1305 | 0.172 |
| 2 | 18.0 | 0.056 | 321 | 1413 | 0.89 | 71 | 9.6 | 1305 | 0.172 |
| 3 | 18.1 | 0.056 | 323 | 1412 | 0.91 | 71 | 9.6 | 1303 | 0.173 |
| 4 | 18.2 | 0.056 | 325 | 1410 | 0.94 | 71 | 9.6 | 1301 | 0.177 |
| 5 | 18.2 | 0.056 | 325 | 1269 | 2.91 | 71 | 9.6 | 1301 | 0.175 |
| 6 | 17.2 | 0.057 | 302 | 1447 | 0.00 | 61 | 8.9 | 1320 | 0.174 |
| 7 | 17.6 | 0.057 | 309 | 1444 | 0.11 | 63 | 9.1 | 1313 | 0.174 |
| 8 | 18.2 | 0.056 | 325 | 1403 | 1.03 | 71 | 9.6 | 1302 | 0.175 |
| 9 | 18.1 | 0.056 | 323 | 1403 | 0.97 | 71 | 9.6 | 1302 | 0.175 |
| 10 | 18.0 | 0.056 | 321 | 1405 | 0.97 | 71 | 9.6 | 1304 | 0.175 |
| 11 | 18.4 | 0.056 | 329 | 1421 | 0.71 | 71 | 9.6 | 1299 | 0.175 |
| 12 | 18.3 | 0.056 | 327 | 1282 | 2.71 | 71 | 9.6 | 1301 | 0.175 |
| 13 | 22.0 | 0.060 | 367 | 1663 | 0.21 | 95 | 10.8 | 1272 | 0.172 |
| 14 | 21.2 | 0.059 | 359 | 1623 | 0.22 | 93 | 10.7 | 1271 | 0.172 |
| 15 | 18.4 | 0.057 | 323 | 1367 | 8.21 | 87 | 10.6 | 1304 | 0.172 |
| 16 | 16.8 | 0.055 | 305 | 1297 | 4.05 | 71 | 9.7 | 1316 | 0.175 |
| 17 | 17.9 | 0.056 | 320 | 1401 | 1.07 | 71 | 9.6 | 1306 | 0.172 |
| 18 | 18.0 | 0.056 | 321 | 1400 | 1.09 | 71 | 9.6 | 1304 | 0.174 |
| 19 | 18.1 | 0.056 | 323 | 1399 | 1.12 | 71 | 9.6 | 1302 | 0.174 |
| 20 | 18.9 | 0.057 | 334 | 1461 | 0.94 | 76 | 9.91 | 1280 | 0.174 |

Table 2 above illustrates optical properties for various modeled fiber examples according to the invention. The optical fibers 10 according to the present invention, preferably exhibit desired optical properties that make them useful as light propagating media in optical transmission systems. In particular, such fibers 10 preferably have a zero dispersion wavelength, $\lambda_0$, of between about 1270 and 1325 nm. The refractive index of the optical fibers 10 is selected such that they, most desirably, exhibit total dispersion between about 16 and 25 ps/nm/km at 1550 nm; more preferably between about 17 and 19 ps/nm/km at 1550 nm.

Further, they also preferably exhibit a dispersion slope at 1550 nm of less than 0.07 ps/nm²/km; more preferably less than 0.06 ps/nm²/km. Kappa, defined herein as the total dispersion at 1550 nm divided by the dispersion slope at 1550 nm, is preferably between 275 and 375 nm; more preferably greater than 300 nm, and most preferably between 300 and 375 nm. Cabled cutoff wavelength is preferably less than about 1530 nm; more preferably less than 1500 nm. Estimated fiber cutoff is preferably less than about 1880 nm; more preferably less than 1850 nm. The inventive optical fibers 10 preferably also exhibit a mode field diameter greater than about 8 µm, more preferably greater than 9.0 µm, and most preferably between 9 µm and 12 µm at 1550 nm. Preferably also, the optical fibers 10 exhibit effective area at 1550 nm of greater than 60 µm²; more preferably greater than 65 µm²; and most preferably in the range of between 60 µm and 100 µm² at 1550 nm. Such fibers 10 according to the invention preferably exhibit attenuation at 1550 nm of less than 0.178 dB; more preferably less than 0.175 dB, and in some embodiments 0.173 dB or below.

The fibers 10 also exhibit excellent bend loss properties, with preferable pin array bend loss values at 1550 nm being less than 10 dB/m; more preferably less than 5 dB/m. Macro-bend loss values at 1550 nm are preferably being less than 25 dB/m for 20 turns on a 20 mm diameter mandrel; more preferably less than 10 dB/m; and in some embodiments less than 1 dB/m. Lateral load losses are preferably less than 5 dB/m at 1550 nm; more preferably less than 2 dB/m at 1550 nm.

Manufacturing Method

The alkali-doped optical fiber is preferably produced by diffusing an alkali metal oxide into a suitable silica glass article that is a precursor to an optical fiber. WO 2005/021455, for example, discloses various methods for producing alkali doped performs and fiber. According to a presently preferred method, in a first step, a silica glass tube suitable for the manufacture of optical fiber is mounted between chucks in a lathe (such as a glass-working lathe or a conventional modified chemical vapor deposition glass-forming lathe). A preferably annular reservoir for receiving an alkali metal source compound is formed near one end of tube. Tube may be pure silica or also may comprise dopants such as, for example, small amounts of fluorine. However, to prevent crystallization of the alkali metal, it is preferable that tube be essentially chlorine free. By essentially chlorine free it is meant that the chlorine content is sufficiently low that optical losses due to alkali chloride crystallization are avoided. In addition, silica glass tube should be essentially free of "water". By "water" we mean the hydroxyl group OH. Water is responsible for an absorption peak at or about 1383 nm and which absorption peak may extend into the operating wavelength regions of an optical fiber. Preferably, glass tube contains less than about 500 ppb by wt. OH; more preferably less than 100 ppb by wt. OH; and more preferably less than about 20 ppb by wt. To ensure that starting glass articles are essentially free from water prior to diffusing an alkali metal oxide dopant, conventional chlorine drying techniques may be employed during manufacture of the silica glass tube. The use of chlorine, however, should be minimized to reduce chlorine concentrations in the glass. In the case of porous soot glass articles, drying is preferably accomplished by exposing the article to a fluorine-containing atmosphere (fluorine sweeping), such as, for example, $CF_4$ or $SiF_4$, or combinations thereof, either after chlorine drying or in place of it. The exposure to a fluorine-containing atmosphere (fluorine sweep) is done at temperatures preferably less than about 1100° C. to avoid doping the glass with high levels of fluorine. Low levels of fluorine doping are desirable, i.e., 0.1 to 0.4 wt. % fluorine, for example.

Once the silica glass tube has been prepared, the alkali source compound is introduced into the tube from the reservoir. The alkali source compound in the reservoir is heated by heat source to form a vapor as tube is simultaneously rotated and also heated. Oxygen or a carrier gas is flowed over the alkali source compound and into tube. The flow of the alkali-containing gas into the tube, combined with heating the tube, facilitates diffusion of the alkali metal oxide into interior surface of tube. Preferably, the tube is heated by heat source to above 1500° C.; more preferably between about 1500° C. and 2000° C. Preferably, heat source is traversed along the length of the tube. Alkali metal oxide source compound preferably comprises an element selected from the group consisting of K, Na, Li, Cs, and Rb. Preferably, alkali metal oxide source compound is a bromide, iodide or fluoride. Most preferably, the alkali metal oxide source compound is KBr, KI or $KNO_3$. The alkali metal oxide (e.g., $K_2O$, $Na_2O$, $LiO_2$, $Rb_2O$, $Cs_2O$ and mixtures thereof) is preferably diffused throughout a depth of between about 100 microns and 500 microns from the inside diffusion surface of tube prior to collapse of tube thereby forming an alkali oxide doped glass tube.

The diffusion process may be followed by a step of further heating the tube to promote a partial collapse of tube by conventional methods. Once the diffusion doping step, and any partial collapse of tube has been completed, the diffusion surface of the tube may be optionally etched with an etchant, suitable for removing silica glass, to a depth sufficient to remove unwanted impurities that may have diffused through the diffusion surface of the tube. An aqueous HF solution may be used as an etchant, for example. More preferably, a fluoride gas such as, for example, $CF_4$, $SF_6$, $NF_3$, $C_2F_6$ or a mixture thereof, is employed. The amount of material removed from inner surface is dependent upon processing conditions during diffusion and any partial tube collapse, but the etching conditions are preferably sufficient to result in the removal of glass from surface to a depth of at least about 5 percent of the total diffusion depth of the alkali metal oxide. Once the optional etching is finalized, silica glass tube is further heated with a heat source to collapse tube and form an alkali metal oxide-doped solid glass rod. After this, preferably, the solid alkali metal oxide-doped glass rod may be etched with a suitable etchant to remove some or all hydrated glass which may have been formed by the torch during collapse of the tube.

Optionally, the alkali-doped glass rod may be heated in a redraw furnace and drawn into a smaller glass rod having a diameter dimension smaller than the original diameter of the alkali-doped glass rod. The outer diameter dimension of the small diameter glass rod resulting from the redrawing process is preferably in the range of 3 mm to 10 mm; more preferably less than 6 mm in diameter dimension. According to this method, a small diameter glass rod is achievable which preferably has a peak alkali metal oxide (e.g., $K_2O$) concentration between about 2 wt. % and 4 wt. %. In particular, having a very small diameter of the alkali-doped rod is advantageous because this concentrates the transition metal impurities present in the rod very near the fiber's centerline where their negative impact is minimized.

Once formed, the small diameter alkali-doped glass rod may be used as a starting rod upon which additional porous glass soot is deposited as overclad using an OVD method. In particular, a glass handle is attached to small diameter alkali-doped glass rod manufactured as heretofore described and becomes an integral part of the resulting preform. Handle provides a method of supporting the silica glass preform resulting from the deposition process during later processing steps. The glass rod having attached handle is mounted in a lathe and is rotated and translated with respect to burner which may be, for example, of the type disclosed in U.S. Pat. No. 4,165,223. Fuel gas and oxygen, or air, are supplied to burner from a source. This mixture is burned to produce a flame which is emitted from burner. A silica precursor gas-vapor mixture is oxidized within the flame to form a silica-containing soot stream which is directed toward glass rod. Suitable means for delivering the gas-vapor mixture to burner are well known in the art; for an illustration of such means reference is made to U.S. Pat. Nos. 3,826,560, 4,148,621 and 4,173,305. Burner is generally operated under conditions that will provide acceptably high laydown rates and efficiency while minimizing the buildup of soot on the face thereof. Under such conditions, the flow rates of gases and reactants from the burner orifices and the sizes and locations of such orifices as well as the axial orientation thereof are such that a well focused stream of soot flows from burner toward glass rod. Composite soot preform is formed by traversing glass rod many times with respect to burner to cause a build-up of many layers of silica soot-containing to form soot coating. The translating motion could also be achieved by moving burner back and forth along rotating glass rod or by the combined translational motion of both burner and glass rod. Soot coating forms at least a portion of the core glass of the composite preform which is preferably comprised of substantially pure silica. Preferably, the soot coating has a density greater than 0.35 g/cc, more preferably between about 0.35 g/cc and 0.5 g/cc.

The composite preform is then dried by exposing it to a chlorine-containing gas and heated in a furnace to consolidate the composite preform to form a clear, solid glass consolidated optical fiber core preform indicated in step of method. During the consolidation step, the composite preform is preferably fluorine swept to remove the undesirable chlorine imparted in the initial drying process. This sweeping comprises exposure to a fluorine-containing gas but only in amounts that adds a small amount of fluorine (0.1 to 0.4 wt %), for example. The clear glass core preform may then be redrawn in a process similar to that process described supra to form a second core rod. The second core rod may be further processed by adding additional glass, such as through depositing glass soot by chemical vapor deposition to form another optical fiber preform. The glass soot is dried, fluorine doped to achieve the desired level of fluorine doping described herein, consolidated, and redrawn into a smaller diameter rod. The silica is sufficiently down doped with fluorine by flood doping (see U.S. Pat. No. 4,629,485). The doping is preferably sufficient to achieve a relative refractive index $\Delta_2\%$ of preferably between −0.39% and −0.70% relative to pure silica. The cladding soot is first dried by subjecting it to a chlorine-containing gas in a furnace at a temperature of about 1125–1150° C. for about 60 minutes. Next, the soot perform is exposed it to a fluorine-containing gas (e.g., $SiF_4$ or $CF_4$) for about 90–105 minutes at 1150–1225° C. and then consolidated by downdriving through the hot zone (of 1390–1460° C.) at about 6–10 mm/min preferably in the presence of the fluorine-containing gas. This preform may be redrawn to form a third rod and the steps repeated again, i.e., deposition, drying, fluorine doping, and consolidation until the proper diameter final perform is achieved. After the complete optical fiber preform is manufactured, the completed optical fiber draw preform is drawn into an alkali metal oxide doped optical fiber.

Manufactured Examples

Figure 20:
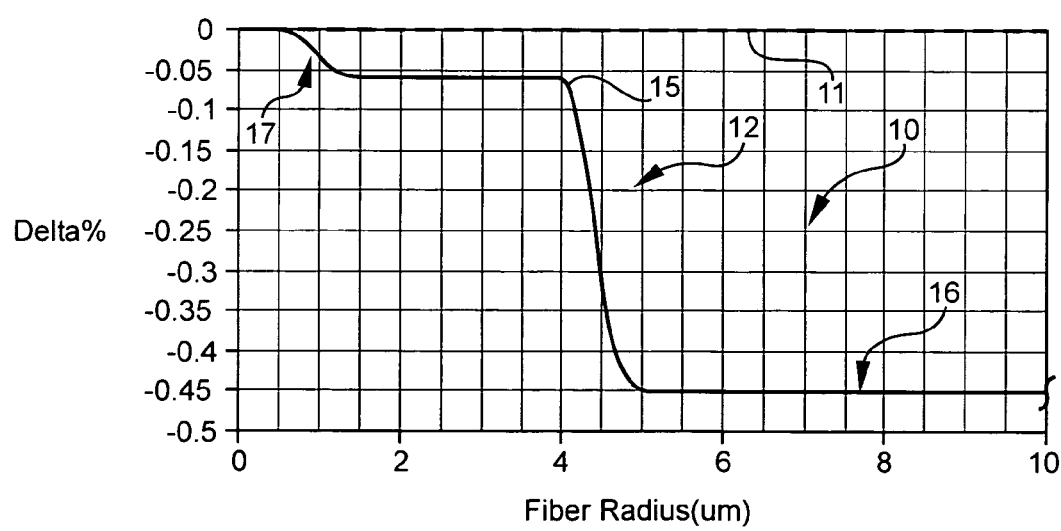
Figure 21:
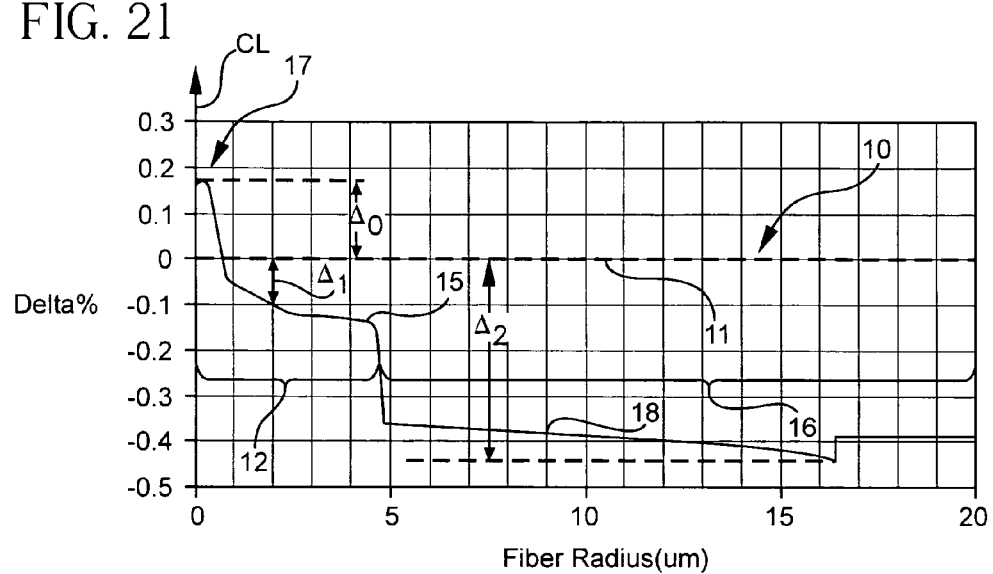
FIGS. 21–22 are relative refractive index plots of manufactured example embodiments of the optical fiber in accordance with the present invention.
Figure 22:
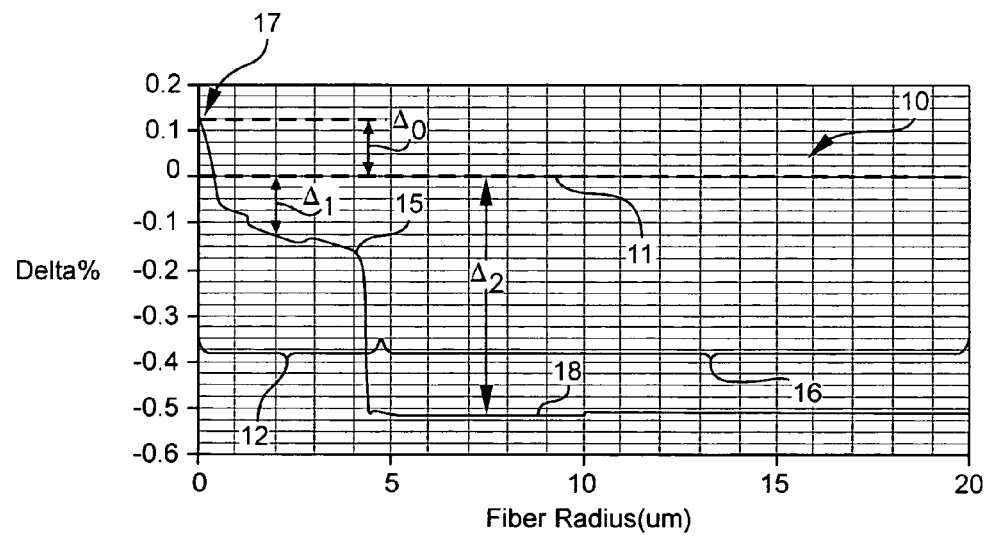

The following actual examples of the inventive fiber were manufactured as described above. The resultant optical fiber refractive index profiles for examples A and B are shown in FIGS. 20 and 21, respectively. A microprobe analysis of the optical fiber was made, and a plot of the dopant concentrations in the optical fiber as a function of radius is shown in FIG. 23, wherein curve 21 represents the concentration of $K_2O$ in wt. %, curve 23 represents the concentration of F in wt. %, and curve 25 represents the concentration of Cl in wt. %. The manufactured optical fiber examples exhibit the optical properties shown below.

TABLE 3

Optical Properties of Manufactured Fiber Examples (@ 1550 nm)

| Ex. # | Disp. ps/nm/ km | Disp. Slope ps/nm/ km$^2$ | Kappa nm | MFD µm | Aeff µm$^2$ | Macro-bend dB/m | Lateral Load dB/m | Attn. dB/ km |
|---|---|---|---|---|---|---|---|---|
| A | 18.1 | 0.059 | 307 | 11.4 | 97.8 | 21.9 | 1.16 | 0.170 |
| B | 18.1 | 0.055 | 328 | 9.8 | 73.3 | 0.01 | 0.20 | 0.173 |

It will be apparent to those skilled in the art that various modifications and variations may be made to the present invention without departing from the scope of the invention. Thus it is intended that the present invention cover the modifications and variations of this invention provided they come within the scope of the appended claims and their equivalents.

What is claimed is:

1. An optical fiber, comprising:
    a core including $SiO_2$, fluorine, and an alkali metal oxide selected from the group consisting of K, Na, Li, Cs and Rb and mixtures thereof, said alkali metal oxide provided in amount of at least 20 ppm wt. %, said core having a core relative refractive index ($\Delta_1$%) measured at 2 microns offset from a fiber centerline, and
    a cladding including an inner cladding surrounding the core including fluorine, said inner cladding having a inner cladding relative refractive index ($\Delta_2$%) measured relative to pure silica between −0.39% and −0.7%.

2. The optical fiber of claim 1 wherein said core relative refractive index ($\Delta_1$%) is between 0.0% and −0.15%.

3. The optical fiber of claim 1 wherein said core relative refractive index ($\Delta_1$%) is between −0.02% and −0.12%.

4. The optical fiber of claim 1 wherein said core further includes fluorine greater than 1000 ppm wt. %, and alkali metal oxide between 20 and 1000 ppm wt. %.

5. The optical fiber of claim 1 wherein $\Delta_2\%-\Delta_1\%$ is between −0.42 and −0.38%.

6. The optical fiber of claim 1 wherein said core includes an alpha profile having an α value of between 12 and 20.

7. The optical fiber of claim 1 wherein said core further includes a center portion having a center relative refractive index ($\Delta_0$%) that is either positive or less negative than the core relative refractive index ($\Delta_1$%).

8. The optical fiber of claim 7 wherein said center relative refractive index ($\Delta_0$%) is between −0.15% and 0.20%.

9. The optical fiber of claim 7 wherein said center portion has an outer radius ($R_0$) of between 0.2 µm and 1.5 µm.

10. The optical fiber of claim 1 wherein said core further includes an outer radius ($R_1$) of between 3.9 to 6.0 µm.

11. The optical fiber of claim 1 wherein said cladding further includes an outer cladding surrounding the inner cladding, said outer cladding having a relative refractive index ($\Delta_3$%) equal to ($\Delta_2$%)+/−0.05%.

12. The optical fiber of claim 1 wherein the refractive index profile is selected to provide dispersion at 1550 nm between 16 and 25 ps/nm/km.

13. The optical fiber of claim 1 wherein the refractive index profile is selected to provide dispersion slope at 1550 nm of less than 0.07 ps/nm$^2$/km.

14. The optical fiber of claim 1 wherein the refractive index profile is selected to provide effective area at 1550 nm greater than 60 µm$^2$.

15. The optical fiber of claim 1 wherein the refractive index profile is selected to provide attenuation at 1550 nm less than 0.178 dB/km.

16. The optical fiber of claim 15 wherein the attenuation at 1550 m is less than 0.175 dB.

17. The optical fiber of claim 1 wherein the refractive index profile is selected to provide a macro-bend loss at 1550 mm of less than 1 dB/m for 20 turns on a 20 mm diameter mandrel.

18. The optical fiber of claim 1 wherein the refractive index profile is selected to provide a zero dispersion wavelength of between 1275 and 1325 nm.

19. An optical fiber, comprising:
    core containing
        $SiO_2$,
        an alkali metal oxide selected from the group consisting of K, Na, Li, Cs and Rb and mixtures thereof,
        fluorine in an amount of between 0.1 and 0.4 wt. %, and
        chlorine in an amount of less than 500 ppm wt. %,
        said core having a core relative refractive index ($\Delta_1$%), measured at 2.0 microns offset from a fiber centerline, of between 0.0% and −0.15%, and a cladding including an inner cladding surrounding the core and including fluorine, said inner cladding having a cladding relative refractive index ($\Delta_2$%) measured relative to pure silica of between −0.39% and −0.7%.

20. An optical fiber, comprising:
    a core including $SiO_2$, fluorine, chlorine, and an alkali metal oxide selected from the group consisting of K, Na, Li, Cs and Rb and mixtures thereof, said core having a core relative refractive index ($\Delta_1$%) measured at 2.0 microns offset from a fiber centerline of between 0.0% and −0.15%, an outer radius ($R_1$) of between 3.9 to 6.0 µm, and an α profile having an α value of between 12 and 20, and
    a cladding, including an inner cladding surrounding the core, said inner cladding including fluorine and having a cladding relative refractive index ($\Delta_2$%) measured relative to pure silica of between −0.39% and −0.7%
    wherein a refractive index profile of the optical fiber is selected to provide
        dispersion at 1550 nm between 15 and 25 ps/nm/km,
        dispersion slope at 1550 nm of less than 0.07 ps/nm$^2$/km,
    effective area at 1550 nm of greater than 60 µm$^2$, and
    attenuation at 1550 nm of less than 0.178 dB.

* * * * *

UNITED STATES PATENT AND TRADEMARK OFFICE
CERTIFICATE OF CORRECTION

PATENT NO. : 7,088,900 B1
APPLICATION NO. : 11/106860
DATED : August 8, 2006
INVENTOR(S) : Snigdharaj Kumar Mishra et al.

It is certified that error appears in the above-identified patent and that said Letters Patent is hereby corrected as shown below:

| Col. | Line | Description |
|---|---|---|
| 12 | 20 | "at 1550 m is less than 0.175 dB."–should read– --at 1550 nm is less than 0.175 dB.-- |
| 12 | 23 | "1550 mm of less than 1 dB/m for 20 turns on a 20 mm"–should read– --1550 nm of less than 1 dB/m for 20 turns on a 20 mm-- |

Signed and Sealed this

Ninth Day of January, 2007

JON W. DUDAS
*Director of the United States Patent and Trademark Office*